United States Patent [19]

Guichard et al.

[11] Patent Number: 4,976,499

[45] Date of Patent: Dec. 11, 1990

[54] BRAKING SYSTEM FOR USE WHEN TOWING AN AIRCRAFT ON THE GROUND

[75] Inventors: Jean Guichard, La Garenne Colombes; Christian Favre, Massy, both of France

[73] Assignee: Messier-Hispano-Bugatti, Montrouge, France

[21] Appl. No.: 449,306

[22] Filed: Dec. 6, 1989

Related U.S. Application Data

[63] Continuation of Ser. No. 136,856, Dec. 22, 1987, abandoned.

[30] Foreign Application Priority Data

Dec. 26, 1986 [FR] France ............................... 86 18199

[51] Int. Cl.$^5$ ............................................. B60T 15/16
[52] U.S. Cl. .................................... 303/13; 188/3 H; 244/110 A; 244/111
[58] Field of Search ................... 188/3 H, 3 R; 303/7, 303/13, 3, 48, 49; 244/50, 110 A, 111; 280/427, 428

[56] References Cited

U.S. PATENT DOCUMENTS

| | | | |
|---|---|---|---|
| 2,365,557 | 12/1944 | Keith | 303/49 |
| 3,034,598 | 5/1962 | Lafaye | 303/49 X |
| 3,048,976 | 8/1962 | Grigsby et al. | 303/7 X |
| 3,350,142 | 10/1967 | Schuman | 303/7 |
| 3,415,576 | 12/1968 | Biabaud | 303/7 |
| 3,912,334 | 10/1975 | Schwerin et al. | 303/7 |
| 4,007,890 | 2/1977 | Bremer et al. | 244/50 |
| 4,056,286 | 11/1977 | Burkett | 303/3 X |
| 4,084,859 | 4/1978 | Bull | 303/106 |
| 4,635,758 | 1/1987 | Beard, Jr. | 303/89 X |

FOREIGN PATENT DOCUMENTS

| | | |
|---|---|---|
| 1506001 | 7/1969 | Fed. Rep. of Germany . |
| 951343 | 4/1949 | France . |
| 2274504 | 9/1976 | France . |
| 662148 | 4/1964 | Italy ............................... 188/3 H |

Primary Examiner—George E. A. Halvosa
Attorney, Agent, or Firm—Sixbey, Friedman, Leedom & Ferguson

[57] ABSTRACT

The system in accordance with the invention provides braking while an aircraft (1) is being towed on the ground by a tractor vehicle (2) which is mechanically connected to the aircraft and which is fitted with a brake device under the control of a brake pedal (27), with the aircraft being fitted with a braking circuit. The system comprises a towing brake member (7) disposed in the aircraft's braking circuit line (34) for connecting the brake control member (27) of the vehicle to the towing brake member (7) of the aircraft.

4 Claims, 1 Drawing Sheet

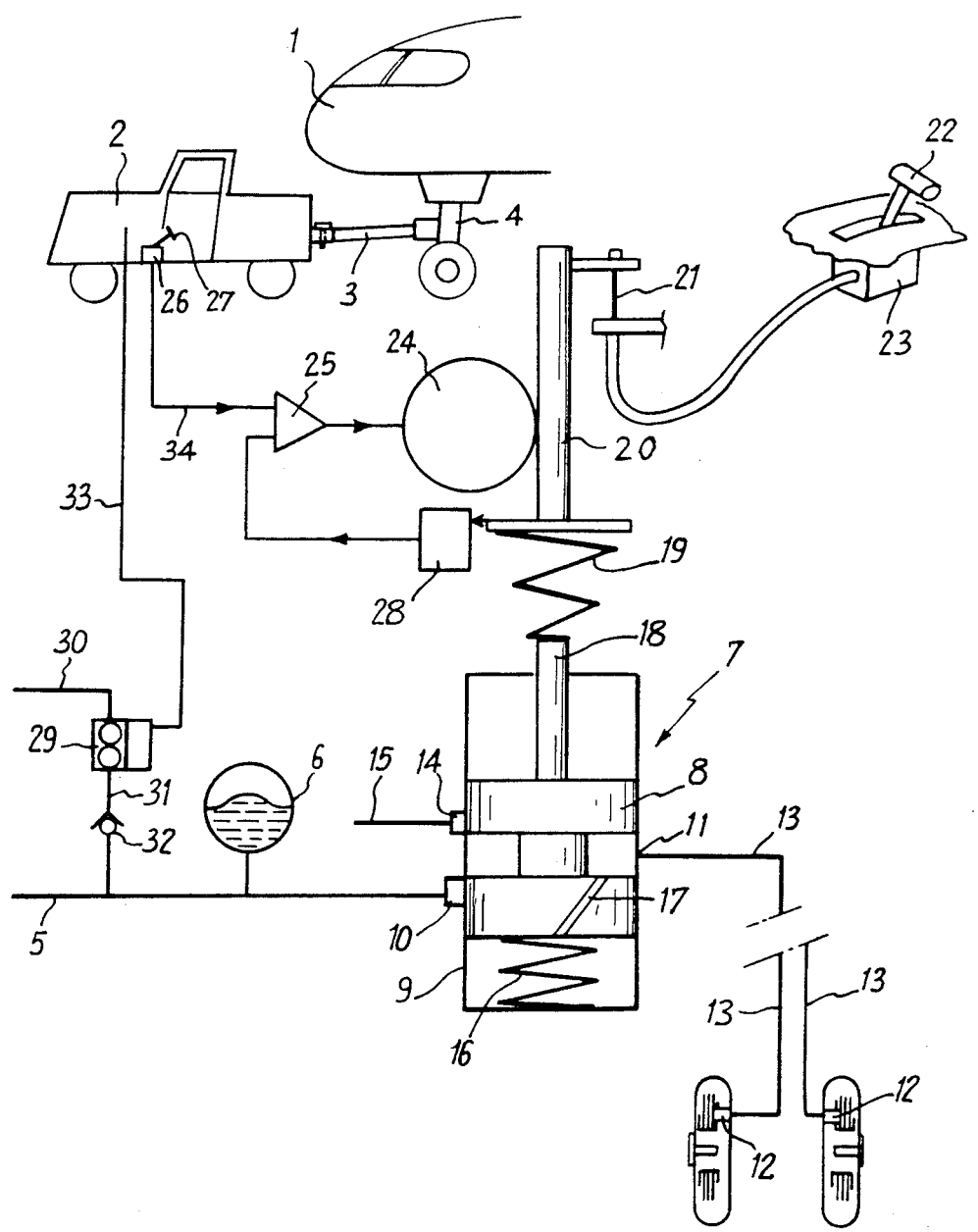

BRAKING SYSTEM FOR USE WHEN TOWING AN AIRCRAFT ON THE GROUND

This application is a Continuation of Ser. No. 07/136,856, filed Dec. 22, 1987, now abandoned.

The present invention relates to a braking system for use when an aircraft is being towed on the ground by a tractor vehicle.

BACKGROUND OF THE INVENTION

By virtue of the increasing development of air travel, airports have grown considerably in size and aircraft parking areas are sometimes far removed from the point where an aircraft needs to be brought prior to a flight in order to allow passengers to board it. Further, it is out of the question to move an aircraft from its parking area to the boarding point using the aircraft's own propulsion means since that would require a pilot on board the aircraft which would make the maneuver too expensive. It is therefore common practice to use a tractor vehicle which is mechanically connected to an aircraft for towing it on the ground. When the tractor vehicle is connected to the aircraft by a tow bar which is generally connected to the aircraft's nose landing gear, the towing speed is very low, being about 4 kilometers per hour (km/h), thereby giving rise to a considerable loss of time. Proposals have also been made for using faster tractor vehicles having a platform onto which the nose landing gear of the aircraft is mounted.

In either case, the tractor-and-aircraft assembly is braked solely by a braking force applied to the tractor's wheels. This solution suffers both from the drawback of requiring a large tractor in order to ensure ground adherence when braking hard while towing a heavy aircraft, and from the drawback of applying considerable stress to the aircraft's nose landing gear since the braking force is transmitted from the tractor to the aircraft via the landing gear.

An aim of the present invention is to provide a system for braking an aircraft while it is being towed on the ground, which system enables the above drawbacks to be avoided while remaining reasonable in cost.

SUMMARY OF THE INVENTION

This aim is achieved in accordance with the invention by providing a braking system for use when an aircraft has its own braking circuit and when it is being towed on the ground by a tractor vehicle which is mechanically linked to the aircraft and which is fitted with a braking device controlled by a braking control member, the system comprising a towing brake member disposed in the aircraft's braking circuit and a connection device providing a connection between the tractor vehicle's braking control member and the aircraft's towing brake member.

Thus, when the tractor vehicle's braking control member is actuated, not only is the tractor braked by its own braking means, but also the aircraft itself is directly braked, thereby minimizing the stresses transmitted over the mechanical link between the tractor and the aircraft.

In accordance with an advantageous version of the invention, the aircraft brake member is constituted by a slide valve driven by an electrical drive member which is connected to the braking control member of the tractor vehicle. Thus, direct aircraft braking can be ensured simply by means of an electrical connection between the tractor vehicle and the aircraft.

In accordance with a preferred aspect of the invention, the electrical drive member is an electric motor connected to the output of a comparator having one input connected to a member for applying a reference value associated with the tractor vehicle's braking member, and having an other input connected to a detector for detecting the position of the slide valve. Thus, it is easy to ensure that the braking action obtained on the aircraft is proportional to the action applied to the tractor vehicle's braking control member.

In accordance with another advantageous aspect of the invention, the electric motor is connected in parallel with a drive member connected to a braking control member of the aircraft. Thus, one of the aircraft's own accessories is used for braking while it is being towed, thereby avoiding any increase in the weight or the cost of the aircraft.

In another preferred embodiment of the invention, the aircraft's braking circuit includes a pump which is driven by an electric motor which is connected to the tractor vehicle. This ensures that the aircraft braking circuit is continually supplied with adequate pressure for obtaining effective braking.

BRIEF DESCRIPTION OF THE DRAWING

An embodiment of the invention is described by way of example with reference to the sole FIGURE of the accompanying drawing which is a diagram of a system in accordance with the invention.

MORE DETAILED DESCRIPTION

With reference to the FIGURE, the system in accordance with the invention is intended to ensure that an aircraft 1 is braked while being towed on the ground by a tractor vehicle 2 which is mechanically linked to the aircraft 1, for example by means of a tow bar 3 which is suitably fixed to the nose landing gear 4 of the aircraft 1.

In the preferred embodiment shown, the towing brake system is associated with the aircraft's parking brake circuit. The parking brake circuit comprises a feed duct 5 connected to a feed pump (not shown) for feeding the braking circuit when the aircraft engines are operating. A hydraulic accumulator 6 is connected to the feed duct 5 and makes it possible to perform a certain number of braking operations even when the normal feed pumps are not operating. In a conventional manner, the parking brake circuit also includes a brake member given an overall reference 7 and constituted by a slide valve having a two-stage differential piston 8 sliding in a housing 9 having an inlet 10 connected to the feed duct 5, an outlet 11 connected to the wheel brakes 12 via lengths of duct 13, and a second outlet 14 connected to a return duct 15. The piston 8 is acted upon by a spring 16 tending to turn off the brake fluid feed and to set up a connection between the length of duct 11 and the return duct 15. A calibrated orifice 17 interconnects the intermediate space in the differential piston 8 with its end face facing the return spring 16. The piston 8 is connected to a piston rod 18 and an operating spring 19 bears against the end thereof, with the operating spring 19 being compressed to a greater or lesser extent by an operating rod 20 which is driven by an operating cable 21 associated with a parking brake control lever 22 via a control box 23.

In the preferred embodiment of the invention, an electric motor 24, e.g. a stepper motor, is associated with the operating rod 20 in order to displace it in parallel with the cable 21. The motor 24 rotates in response to signals coming from a comparator 25 having a first input connected by a line 34 to a member 26 associated with the brake pedal 27 of the tractor vehicle 2 and serving to send a reference value, and having a second input connected to a position detector 28 for detecting the position of the operating rod 20, for example a potentiometer type position detector associated with a cursor mounted on the operating rod 20.

Preferably an electric pump 29 is also provided in accordance with the invention, said pump having an inlet orifice connected to a tank of brake fluid via a length of duct 30 and having an outlet orifice connected to the feed duct 5 via a length of duct 31 which includes a non-return valve 32. The electric pump 29 is connected to the tractor vehicle 2 via an electricity power supply cable 33.

When the aircraft is in operation, the parking brake circuit is used normally by operating the parking brake lever 22. When the aircraft is to be towed by a tractor 2, the electricity power supply line 33 is installed and the first input of the comparator 25 is connected to the member 26 in the tractor 2 for generating a reference value, and thereafter the control lever 22 is moved to its brake-off position. In this position, the slide valve 7 in the parking brake circuit is under the control of the comparator 25 which operates via the electric motor 24.

Naturally the invention is not limited to the embodiment described and the person skilled in the art will be able to implement variants In particular, instead of using the slide valve in the aircraft's parking brake circuit, it would be possible to act on some other braking member in the aircraft's brake circuit or to provide a special braking member in the braking circuit.

The direct electrical connection between the tractor and the aircraft could be replaced by a hydraulic connection, in which case the braking circuit of the tractor 2 would be directly associated with the braking circuit of the aircraft However, this solution requires special precautions to be taken in order to ensure that the brake fluid used in the tractor is of sufficient purity to avoid polluting the braking circuit in the aircraft while the towing brake system is being used.

Although, in accordance with the invention, it is preferable to use an electric pump 29 (which may be a low power pump) in the aircraft's braking circuit in order to ensure that there is sufficient brake fluid pressure in the circuit, it would also be possible to use the aircraft's own feed pumps by driving them from the aircraft's auxiliary power supply.

We claim:

1. A braking system for use when towing an aircraft on the ground with a tractor vehicle, the tractor vehicle being mechanically linked to the aircraft;

the aircraft comprising a brake circuit, said brake circuit comprising a feed pump operable when an engine of the aircraft is running connected by a feed duct to a hydraulic accumulator, wheel brakes, a brake member connecting said hydraulic accumulator to said wheel brakes, and a control means for moving said brake member manually from within the aircraft and activating said wheel brakes, said hydraulic accumulator, said brake member, said wheel brakes and said control means defining an aircraft parking brake circuit that operates without the operation of said feed pump; and the tractor vehicle comprising a brake control member which controls the braking of the tractor vehicle and the aircraft, and brake means for transmitting a braking signal from said brake control member of the tractor vehicle to said brake member of said aircraft parking brake circuit and for controlling said brake member of said parking brake circuit without operation of said feed pump in parallel with and independently from said control means of said parking brake circuit, whereby braking on the towed aircraft is effected by the parking brake circuit of the aircraft under the control of said brake control member of the tractor vehicle without operation of said feed pump that is used in said braking circuit when aircraft engines are operating and independent of control from the towed aircraft.

2. A braking system according to claim 1 wherein said brake member of said aircraft parking brake circuit comprises a slide valve having a position detector, and said braking system further comprises a comparator having a first input connected to said brake control member of said tractor vehicle to generate a reference value signal and a second input connected to said position detector, and an operating member means which drives said slide valve and is connected to said brake control member via said brake means and said comparator.

3. A braking system according to claim 2 further comprising an electric pump connected to said hydraulic accumulator, and a supply cable connecting said electric pump to the tractor vehicle.

4. A braking system according to claim 3 wherein said electric pump is part of said parking brake circuit, and said electric pump can supply sufficient fluid to said hydraulic accumulator to permit the braking operation with a reduced power supply without requiring the engines of the aircraft to operate.

* * * * *